(12) United States Patent
Kaizuka et al.

(10) Patent No.: US 6,570,288 B1
(45) Date of Patent: May 27, 2003

(54) OUTER ROTOR TYPE BRUSHLESS DIRECT CURRENT MOTOR

(75) Inventors: Masaaki Kaizuka, Wako (JP); Kazuma Okuda, Wako (JP); Kazunari Takahashi, Wako (JP); Masaharu Hosoda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/878,907

(22) Filed: Jun. 13, 2001

(30) Foreign Application Priority Data

Jun. 20, 2000 (JP) ........................................ 2000-185110

(51) Int. Cl.⁷ ............................................. H02K 21/22
(52) U.S. Cl. ...................... 310/156.55; 310/156.19; 310/156.38; 310/156.43; 310/156.21; 310/156.01
(58) Field of Search ....................... 310/156.55, 156.19, 310/156.26, 156.01, 156.38, 156.43, 154.19, 67 R, 214, 156.21

(56) References Cited

U.S. PATENT DOCUMENTS

| | | | | |
|---|---|---|---|---|
| RE31,947 E | * | 7/1985 | Farr .......................... 417/313 |
| 4,575,652 A | * | 3/1986 | Gogue .................. 310/156.43 |
| 4,672,253 A | * | 6/1987 | Tajima et al. ............... 310/269 |
| 4,751,415 A | * | 6/1988 | Kitamori et al. ........ 310/156.01 |
| 4,877,986 A | * | 10/1989 | Shimizu ...................... 310/153 |
| 5,095,238 A | * | 3/1992 | Suzuki et al. .......... 310/156.46 |
| 5,345,669 A | * | 9/1994 | Zigler et al. .................... 29/598 |
| 5,506,557 A | * | 4/1996 | Sakaguchi et al. .......... 335/305 |
| 5,723,931 A | * | 3/1998 | Andrey ........................ 242/433 |
| 5,753,991 A | * | 5/1998 | Couture et al. ........ 310/156.46 |
| 5,889,342 A | * | 3/1999 | Hasebe et al. ................ 310/54 |
| 5,936,322 A | * | 8/1999 | Yamaguchi et al. ........ 310/156 |
| 6,013,963 A | * | 1/2000 | Shelton, Jr. ................. 310/179 |
| 6,049,153 A | * | 4/2000 | Nishiyama et al. .......... 310/156 |
| 6,140,728 A | * | 10/2000 | Tomita et al. ............... 310/156 |
| 6,172,439 B1 | * | 1/2001 | Ishizuka ................. 310/156.27 |
| 6,252,323 B1 | * | 6/2001 | Nishikawa et al. ..... 310/156.01 |
| 6,300,700 B1 | * | 10/2001 | Nishiyama et al. ........... 310/49 |
| 6,335,582 B1 | * | 1/2002 | Abukawa et al. ........... 310/214 |
| 6,369,477 B1 | * | 4/2002 | Bonin .................... 310/156.01 |
| 6,411,002 B1 | * | 6/2002 | Smith et al. ........... 310/156.01 |
| 2001/0017493 A1 | * | 8/2001 | Sakamoto .................. 310/49 R |
| 2002/0175582 A1 | * | 11/2002 | Lopatinsky et al. ... 310/156.01 |

FOREIGN PATENT DOCUMENTS

| | | | | |
|---|---|---|---|---|
| JP | 55122465 | * | 3/1979 | .......... H02K/21/22 |
| JP | 56056160 | * | 10/1979 | .......... H02K/21/22 |
| JP | 59204455 | * | 11/1984 | .......... H02K/21/08 |
| JP | 62285651 | * | 12/1987 | .......... H02K/21/08 |
| JP | 02139485 | * | 5/1990 | .......... H02K/21/22 |
| JP | 2000069696 A | * | 8/1998 | ............ H02K/1/27 |
| JP | 000823771 A1 | * | 11/1998 | .......... H02K/21/16 |
| JP | 11-215749 | | 8/1999 | |

(List continued on next page.)

Primary Examiner—Nestor Ramirez
Assistant Examiner—H. Y. M. Elkassabgi
(74) Attorney, Agent, or Firm—Armstrong, Westerman & Hattori, LLP

(57) ABSTRACT

An outer rotor type brushless direct current motor has an outer rotor including a plurality of permanent magnets attached along the inner circumference of an annular yoke such that the magnetic poles face the S magnetic poles. Thin sections are formed by chamfering the radially outer periphery of the two end sections in the circumferential direction of each of the permanent magnets. Magnetic flux passage sections of the yoke providing connection between the thin sections of adjacent permanent magnets are expanded radially inwards. In accordance with the above-mentioned arrangement, the cross section of the magnetic path in the magnetic flux passage sections is increased, thereby suppressing the occurrence of magnetic saturation and preventing the maximum torque of the permanent magnets from decreasing while reducing their size. Moreover, because the magnetic flux passage sections of the yoke are expanded radially inwards, the external dimensions of the yoke do not increase.

2 Claims, 6 Drawing Sheets

FOREIGN PATENT DOCUMENTS

| | | | | | |
|---|---|---|---|---|---|
| JP | 2000152540 | * | 5/2000 | ............ | H02K/1/27 |
| JP | 2000159742 | * | 5/2000 | ............ | H02K/21/22 |
| JP | 10129766 A1 | * | 6/2000 | ............ | H02K/29/00 |
| JP | 2000185110 | * | 6/2000 | ............ | H02K/29/00 |
| JP | 00124562 | * | 11/2000 | ............ | H02K/1/27 |
| JP | 0200035393 A | * | 12/2000 | ............ | H02K/1/27 |
| JP | 02001204147 A | * | 7/2001 | ............ | H02K/1/27 |
| JP | 02001211577 A | * | 8/2001 | ............ | H02K/1/27 |

* cited by examiner

OUTER ROTOR TYPE BRUSHLESS DIRECT CURRENT MOTOR

BACKGROUND OF THE INVENTION

1. Field of the Invention

The present invention relates to an outer-rotor-type brushless direct current motor in which an annular outer rotor having a plurality of permanent magnets is disposed radially outside a stator so as to be rotatable.

2. Description of the Related Art

Japanese Patent Application Laid-open No. 11-215749 discloses an outer-rotor-type brushless direct current motor in which an outer rotor having a plurality of permanent magnets placed in the circumferential direction is disposed radially outside a stator so as to be rotatable. This outer rotor type brushless direct current motor reduces noise by recessing the two end sections in the circumferential direction of each of the permanent magnets of the outer rotor, that is to say, the radially inner periphery of the end sections of adjacent permanent magnets that face each other, so as to make the cogging torque waveform almost sinusoidal.

SUMMARY OF THE INVENTION

In order to increase the maximum torque in an outer rotor type brushless direct current motor, it is a shortcut to increase the size of the permanent magnets, but this causes the external dimensions of the outer rotor to increase accordingly. In order to reduce the external dimensions without reducing the maximum torque, high performance rare earth magnets are used as the permanent magnets instead of ordinary ferrite magnets, or a material with a high magnetic flux density is used for the cores. Reduction in the size of the air gap between the outer rotor and the stator is also considered to be effective.

However, the use of rare earth magnets and the use of a high magnetic flux density material for the cores increase the cost. Further, when using ferrite magnets, if a narrow air gap is set, the performance is degraded at low temperatures as a result of a decrease in magnetization.

The present invention has been achieved in view of the above-mentioned circumstances, and it is an object of the present invention to reduce the external dimensions of an outer rotor type brushless direct current motor without reducing its maximum torque.

In order to achieve the above-mentioned object, an outer rotor type brushless direct current motor of the present invention includes a stator fixed so as to surround the outer periphery of a rotating shaft, and an outer rotor arranged so as to surround the outer periphery of the stator and able to rotate around the rotating shaft, the outer rotor being formed from an annular yoke and a plurality of permanent magnets attached along the inner periphery of the yoke so that the N magnetic poles face the S magnetic poles, wherein the radially outer periphery of the two end sections in the circumferential direction of each of the permanent magnets is reduced in thickness so as to form thin sections, and magnetic flux passage sections of the yoke providing connection between the thin sections of adjacent permanent magnets are increased in thickness.

In accordance with the above-mentioned arrangement, because the outer periphery of the two end sections in the circumferential direction of the permanent magnet is reduced in thickness so as to form thin sections, the volume of the permanent magnets can be reduced, thereby reducing cost. Because the magnetic flux passage sections of the yoke which provide connection between the thin sections of adjacent permanent magnets are made thick, the cross-section of the magnetic path in the magnetic flux passage sections is widened, thereby suppressing the occurrence of magnetic saturation and preventing a decrease in maximum torque. Moreover, because the magnetic flux passage sections of the yoke are expanded radially inwards, the external dimensions of the yoke do not increase. Furthermore, because the thick and thin sections of the permanent magnets are arranged along the circumferential direction, the cogging torque can be reduced, thereby reducing noise during operation. Because it is unnecessary to reduce the air gap in order to guarantee the maximum torque, there is no possibility of the performance being degraded at low temperature due to a decrease in the magnetization.

BRIEF DESCRIPTION OF THE DRAWINGS

The present invention is described below by reference to the embodiments of the present invention shown in the attached drawings.

FIG. 1 is a view of an in-line multiple cylinder engine along the axial direction of the crankshaft;

FIG. 2 is a magnified cross sectional view of an essential part of FIG. 1;

FIG. 3 is a cross sectional view at line 3—3 in FIG. 2;

FIG. 4 is a magnified view of an essential part of FIG. 2;

DETAILED DESCRIPTION OF THE PREFERRED EMBODIMENTS

Figure 1:
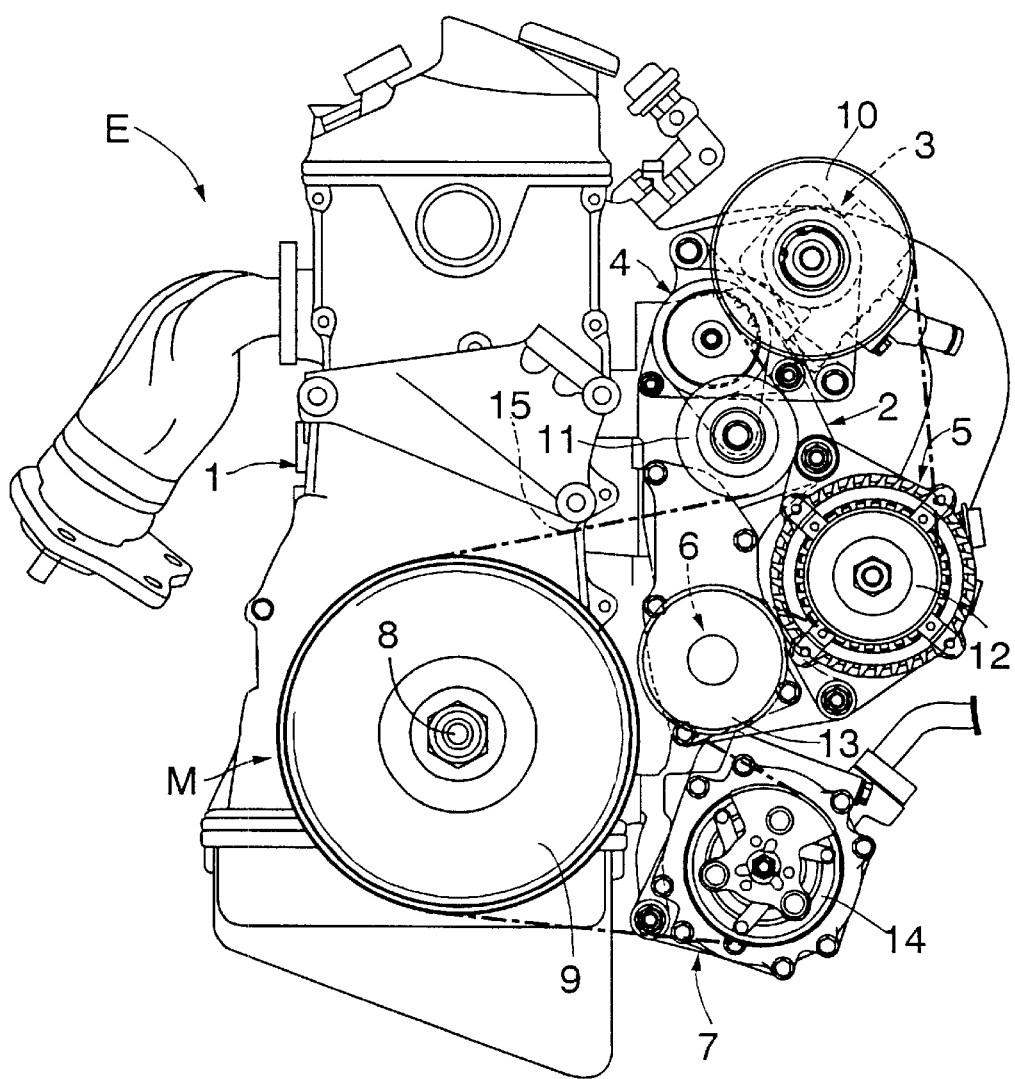
FIGS. 1 to 4 illustrate a first embodiment of the present invention, where

As shown in FIG. 1, an accessory attachment bracket 2 is fixed to a side face of an engine block 1 of an in-line multiple cylinder engine that is to be mounted in a vehicle. An oil pump 3 for power steering, an auto tensioner 4, an alternator 5, a water pump 6 for cooling the engine and a compressor 7 for air conditioning are fixed to the above-mentioned accessory attachment bracket 2. A single endless belt 15 is wrapped around a crank pulley 9 provided on a shaft end of a crankshaft 8 of the engine E (the shaft end on the side opposite to the transmission), an oil pump pulley 10 is provided on the oil pump 3, a tensioner pulley 11 is provided on the auto tensioner 4, an alternator pulley 12 is provided on the alternator 5, a water pump pulley 13 is provided on the water pump 6 and a compressor pulley 14 is provided on the compressor 7. A driving force of the crankshaft 8 is transmitted to the oil pump 3, the alternator 5, the water pump 6 and the compressor 7 via the endless belt 15, and a tension is applied to the endless belt 15 by the auto tensioner 4.

The tensioner pulley 11 and the water pump pulley 13 are operated along the back surface of the endless belt 15. By employing the single endless belt 15 and using the back surface thereof as well, not only can the accessories 3 to 7 be disposed close to one another in a compact manner but also the accessories 3 to 7 can be reliably driven by ensuring that the endless belt 15 has a sufficient wrap angle around each of the pulleys 10 to 14.

Figure 2:
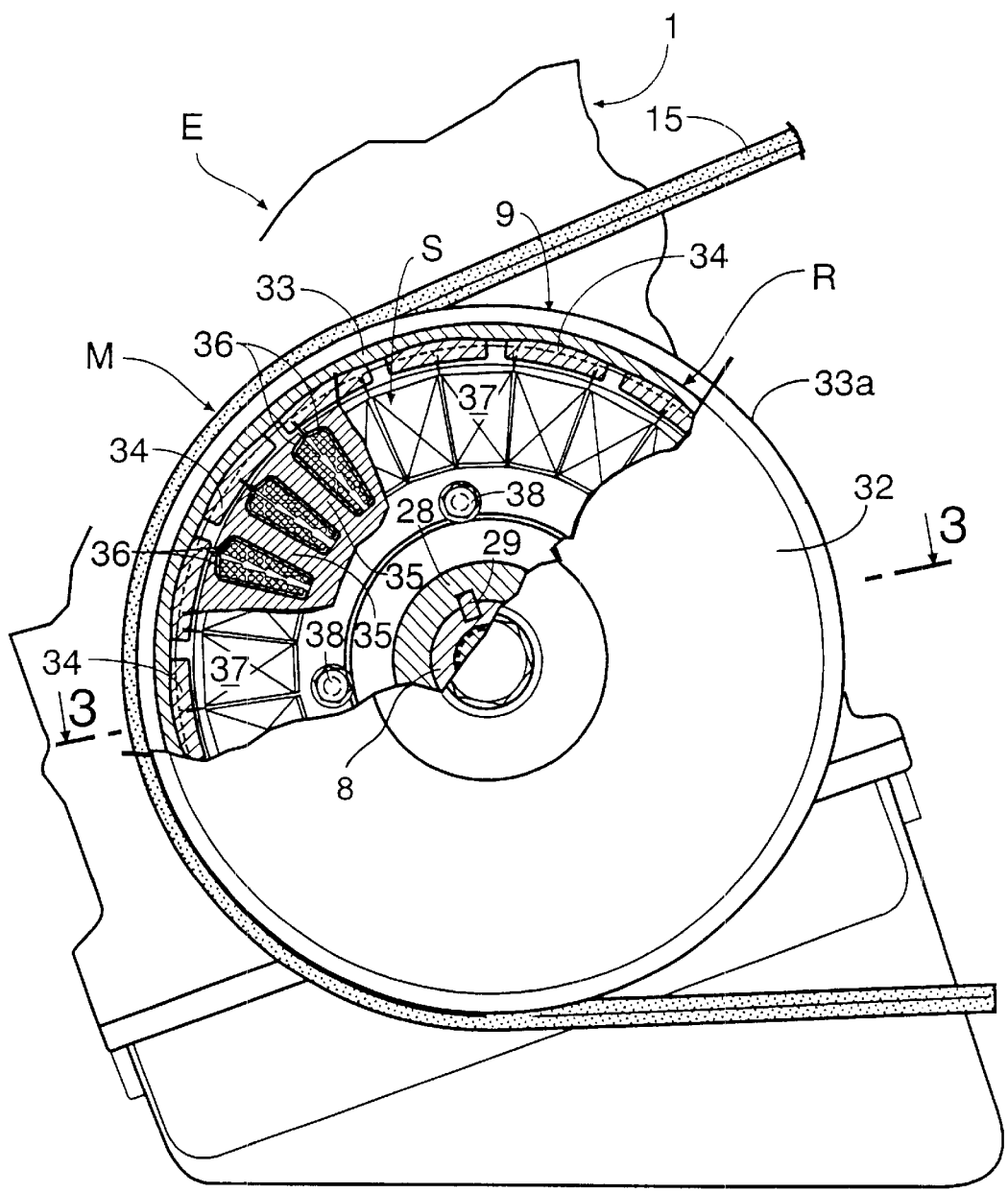
Figure 3:
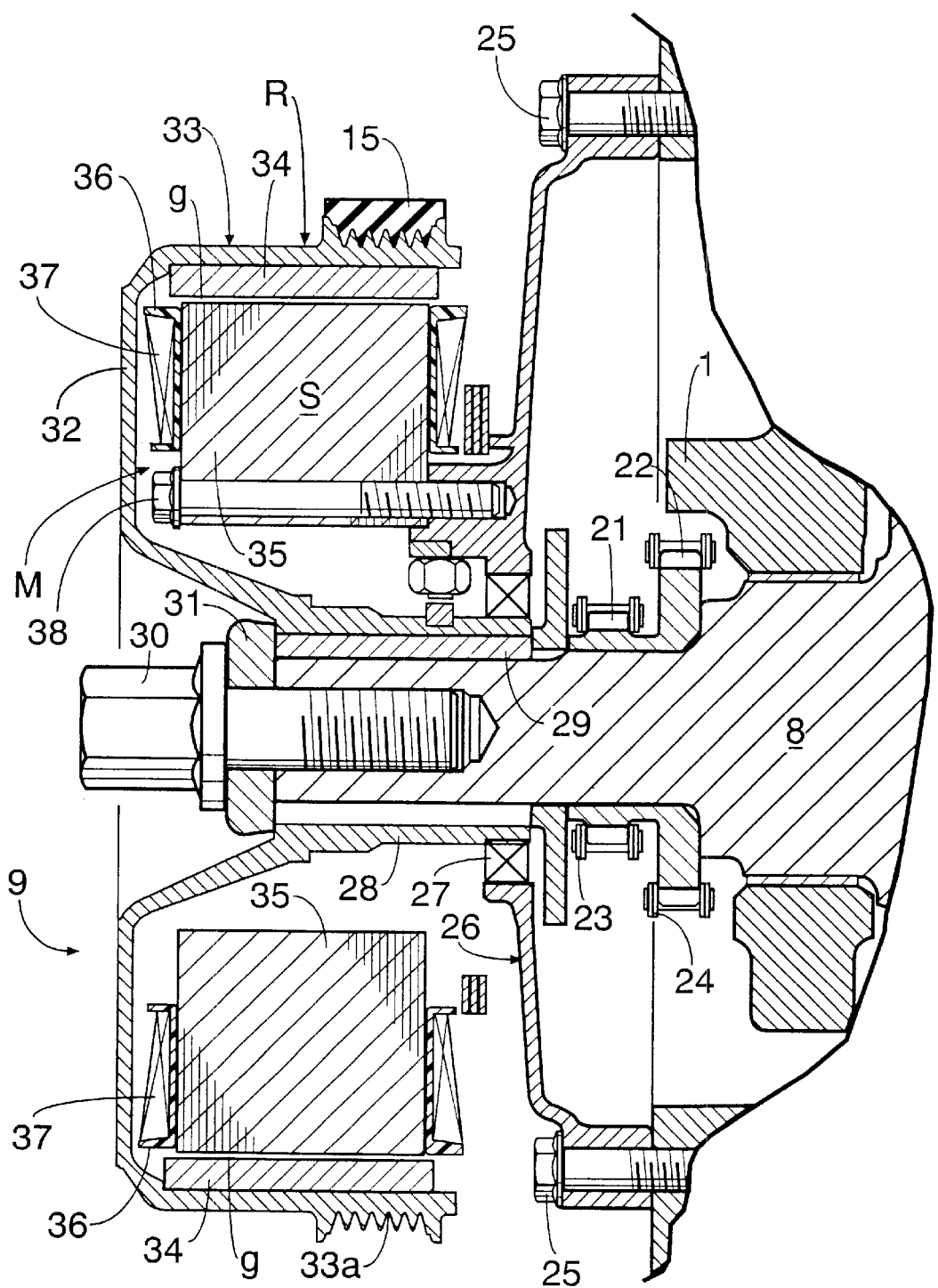
Figure 4:
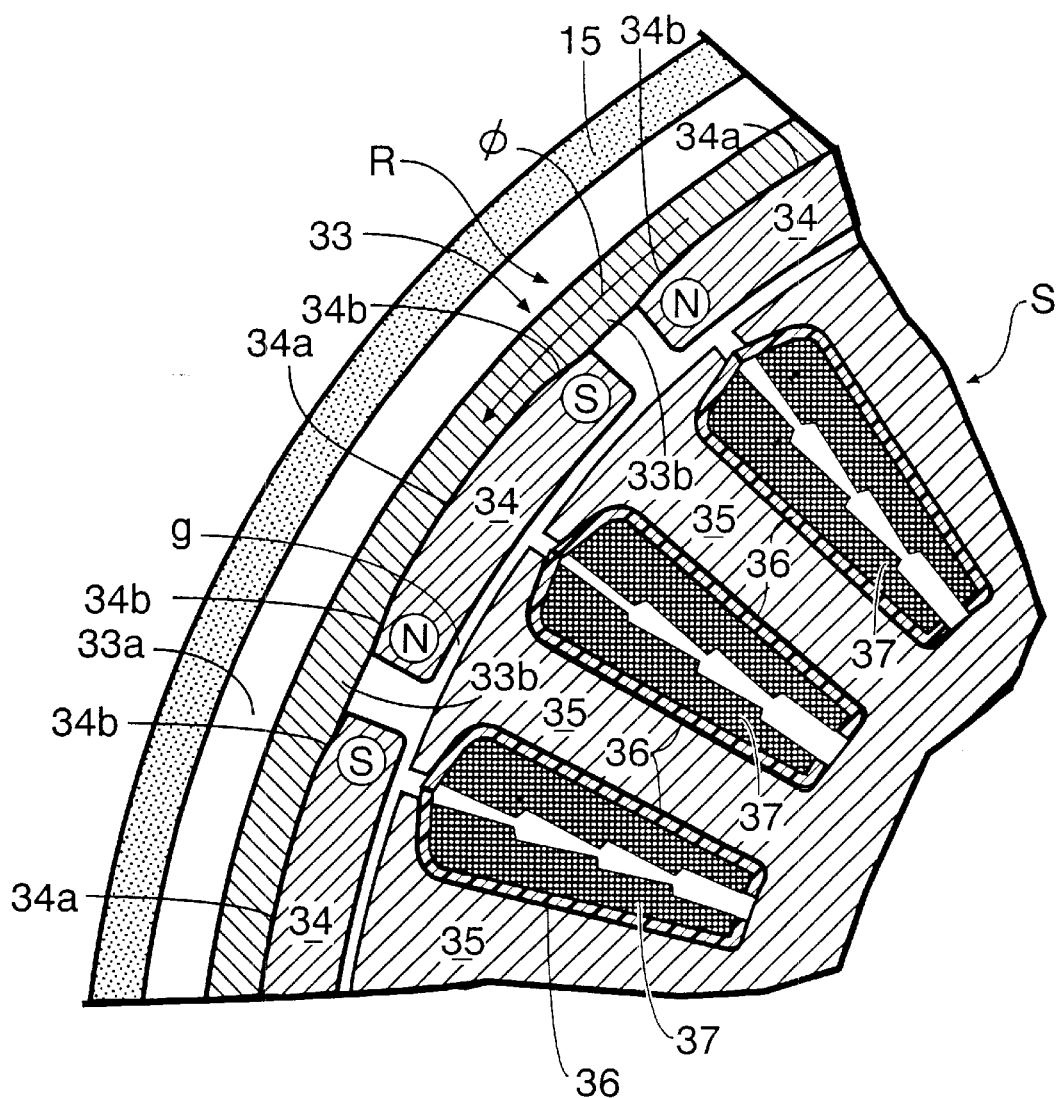

As is clear from FIGS. 2 to 4, a camshaft drive sprocket 21 and a balancer shaft drive sprocket 22 which are formed integrally with each other are fixed to the crankshaft 8 which projects out of the engine block 1. An endless chain 23 wrapped around the camshaft drive sprocket 21 and an endless chain 24 wrapped around the balancer shaft drive sprocket 22 are covered with a chain cover 26 joined to the engine block 1 by means of bolts 25.

An end of the crankshaft 8 projecting out of the chain cover 26 through a sealing member 27 is fitted in a boss 28 of the crank pulley 9 via a key 29 and is prevented from falling out by means of a bolt 30 and a washer 31. An annular yoke 33 is formed integrally with the outer edge of a side wall 32 which extends radially from the boss 28 of the crank pulley 9. A pulley channel 33a is formed on the outer surface of the yoke 33, the endless belt 15 being engaged with the pulley channel 33a. An annular space is formed inside the crank pulley 9, and an outer rotor type brushless direct current motor M functioning both as a starter motor and as a generator is housed in this annular space.

The brushless direct current motor M has a plurality of permanent magnets 34 fixed along the inner periphery of the yoke 33 of the crank pulley 9, and the yoke 33 and the permanent magnets 34 form an outer rotor R of the brushless direct current motor M. A stator S comprising a plurality of cores 35 placed radially around the crankshaft 8 and a plurality of coils 37 wound around the cores 35 via bobbins 36 is fixed to the outer face of the chain cover 26 by means of a plurality of bolts 38. The outer periphery of the cores 35 faces the inner periphery of the permanent magnets 34 across a small air gap g (see FIGS. 3 and 4).

As is shown in detail in FIG. 4, each of the permanent magnets 34 fixed to the inner periphery of the yoke 33 has N and S magnetic poles at the two ends of the magnet in the circumferential direction, and the N magnetic pole of a permanent magnet 34 faces the S magnetic pole of its adjacent permanent magnet 34. The inner periphery of each of the permanent magnets 34 forms an arc having the axis of the crankshaft 8 at its center, and there is a constant air gap g between the inner periphery of the permanent magnets 34 and the outer periphery of the cores 35. Each of the permanent magnets 34 has a thick section 34a in the middle in the circumferential direction and a pair of thin sections 34b extending on either side of the thick section 34a in the circumferential direction. The thickness of the thick section 34a is uniform in the circumferential direction, but the thicknesses of the thin sections 34b are gradually decreased as they move away from the thick section 34a by chamfering the outer periphery of the permanent magnets 34.

The outer periphery of the yoke 33 is circular, but its inner periphery is made non-circular so as to match the shape of the outer periphery of the above-mentioned permanent magnets 34. That is to say, the sections corresponding to both the thin sections 34b of adjacent permanent magnets 34 that face each other, and the spaces between these thin sections 34b and 34b are expanded radially inwards so as to form thick magnetic flux passage sections 33b.

When the coils 37 of the brushless direct current motor M are demagnetized, the crank pulley 9 functions simply as a pulley, but alternately exciting the coils 37 with a predetermined timing generates an attractive force and a repulsive force in the permanent magnets 34, and the crank pulley 9 is rotated, thereby cranking the crankshaft 8 and restarting the engine E which has been stopped. When the crankshaft 8 is rotated by a driving force transmitted back from the driven wheels to the engine E while the vehicle is being braked, the brushless direct current motor M functions as a generator, thereby providing a regenerative braking power.

Figure 6:
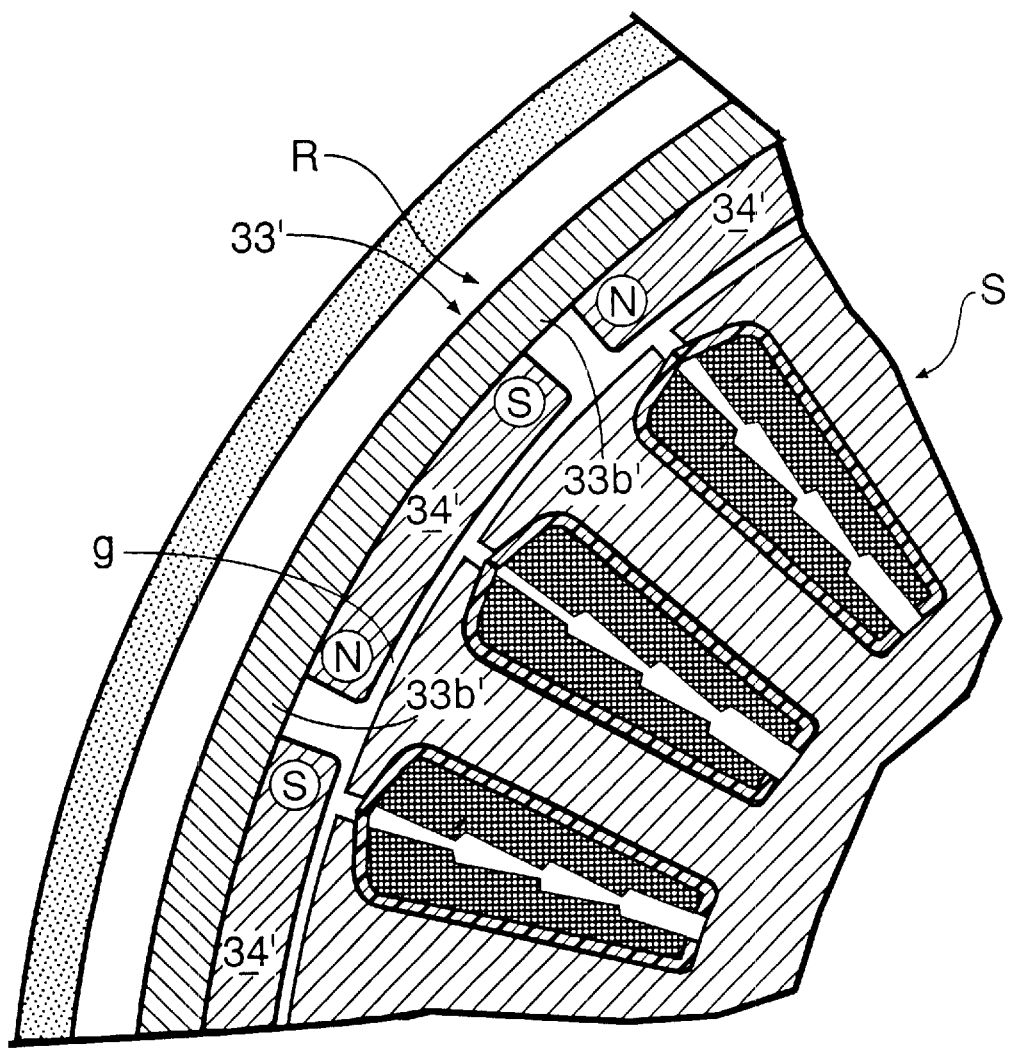
FIG. 6 is a diagram corresponding to FIG. 4 of a prior art outer rotor type brushless direct current motor.

The arrangement of the yoke 33 and the permanent magnets 34, as shown in FIG. 4, can provide the following outstanding effects in comparison with a conventional prior art arrangement shown in FIG. 6, in which a yoke 33' and permanent magnets 34' have uniform thicknesses.

Because the thin sections 34b are formed by chamfering the two end sections in the circumferential direction of the permanent magnets 34, the volume of the permanent magnets 34 can be reduced, thereby contributing to a reduction in cost when using expensive rare earth permanent magnets 34. In the conventional prior art arrangement shown in FIG. 6, because the cross section of the magnetic path is small in the magnetic flux passage sections 33b' of the yoke 33' between adjacent permanent magnets 34', these magnetic flux passage sections 33b' are magnetically saturated, and as a result there is the problem that the magnetic flux in the yoke 33' decreases, thereby limiting the maximum torque. On the other hand, in the present embodiment, because the cross section of the magnetic path is large in the magnetic flux passage sections 33b, magnetic saturation can be suppressed, sufficient magnetic flux $\phi$ in the yoke 33 can be guaranteed while compensating for the decrease in volume of the permanent magnets 34, and it is possible to prevent the maximum torque from decreasing while reducing the size of the permanent magnets 34. Moreover, because the magnetic flux passage sections 33b of the yoke 33 are expanded radially inwards, the external dimensions of the yoke 33 do not increase due to the magnetic flux passage sections 33b.

Because the thick sections 34a and the thin sections 34b are arranged in the circumferential direction on the permanent magnets 34, high frequencies in the magnetic flux density profile in the air gap g can be decreased to thereby provide a sinusoidal waveform, and the cogging torque can be decreased, thereby reducing noise. Furthermore, because the maximum torque can be ensured without decreasing the air gap g, there is no possibility of degrading the performance at low temperature as a result of a decrease in the magnetization.

Figure 5:
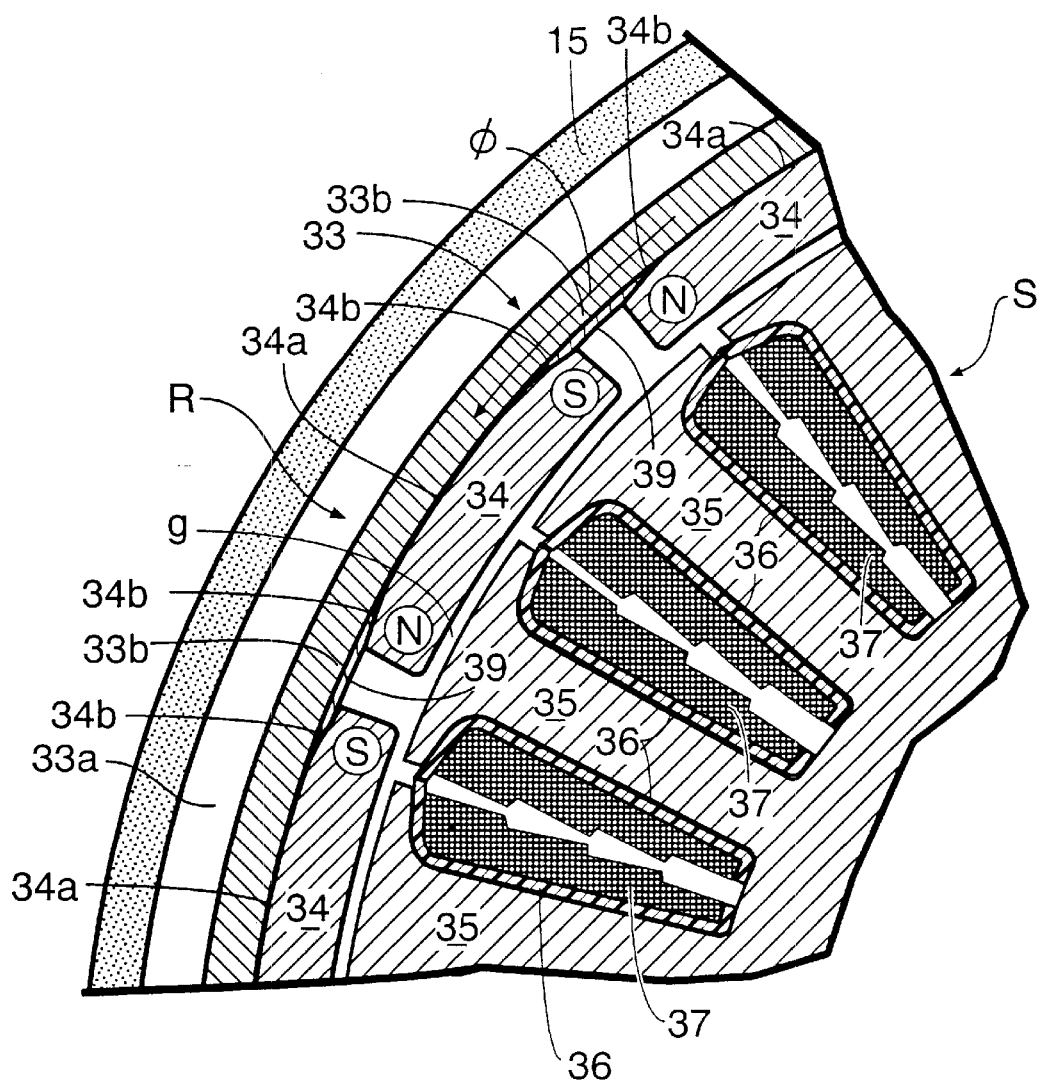
FIG. 5 is a diagram corresponding to FIG. 4 showing a second embodiment of the present invention.

A second embodiment of the present invention will now be explained with reference to FIG. 5.

In the first embodiment the magnetic flux passage sections 33b are formed by expanding the inner periphery of the yoke 33 inwards in the radial direction, but in the second embodiment additional magnetic members 39 are fixed to the inner periphery of a uniform thickness yoke 33, thereby forming thick magnetic flux passage sections 33b. In accordance with the second embodiment, the yoke 33 can be machined easily while ensuring the same magnetic performance as in the first embodiment, thereby reducing the machining cost.

Embodiments of the present invention have been described in detail above, but the present invention can be modified in a variety of ways without departing from the spirit and scope of the invention.

For example, in the present embodiments an outer rotor type brushless direct current motor M functioning as a starter motor and a generator for an engine E is illustrated, but the present invention can be applied to an outer rotor type brushless direct current motor for any other purpose.

What is claimed is:

1. An outer rotor type brushless direct current motor, comprising:
   a stator fixed so as to surround an outer periphery of a rotating shaft; and
   an outer rotor arranged so as to surround the outer periphery of the stator and to rotate around the rotating shaft,
   wherein the outer rotor is formed from an annular yoke and a plurality of permanent magnets attached along the inner periphery of the yoke, each said permanent magnet having an N magnetic pole and an S magnetic pole on either end and oriented in a circumferential direction such that the N magnetic pole of each permanent magnet faces the S magnetic pole of an adjacent one of said permanent magnets, and wherein the radially outer periphery of the two end sections in the circumferential direction of each of the permanent magnets has a thickness less than a center section of the permanent magnet so as to form thin sections, and magnetic flux passage sections of the yoke providing connection between the thin sections of adjacent permanent magnets have a thickness greater than sections of the yoke adjacent center sections of said permanent magnets.

2. An outer rotor type brushless direct current motor according to claim 1, wherein said motor is disposed in a crank pulley that is mounted on a shaft end of a crankshaft of an engine, said motor being used as at least one of a starter motor and a generator for said engine, and wherein a pulley channel is provided on an outer periphery of the yoke.

* * * * *